United States Patent [19]

Miller

[11] Patent Number: 5,570,780

[45] Date of Patent: Nov. 5, 1996

[54] PORTABLE COMPUTER CARRYING CASE

[75] Inventor: Douglas C. Miller, Severna Park, Md.

[73] Assignee: Codi, Inc., Harrisburg, Pa.

[21] Appl. No.: 423,215

[22] Filed: Apr. 17, 1995

[51] Int. Cl.⁶ .......................... B65D 85/68; B65D 81/05
[52] U.S. Cl. ........................ 206/305; 206/320; 206/522
[58] Field of Search .................................. 206/305, 320, 206/522, 576

[56] References Cited

U.S. PATENT DOCUMENTS

| | | | |
|---|---|---|---|
| 3,398,501 | 8/1968 | Aninger | 53/35 |
| 3,552,466 | 1/1971 | Fairchilds | 150/0.5 |
| 3,587,794 | 6/1971 | Mattel | 190/43 |
| 3,711,175 | 1/1973 | Sottsass | 312/208 |
| 3,770,187 | 11/1973 | Faires et al. | 229/39 |
| 3,889,743 | 6/1975 | Presnick | 165/46 |
| 3,891,082 | 6/1975 | Fall | 206/8 |
| 3,949,879 | 4/1976 | Peterson et al. | 206/522 |
| 4,044,867 | 8/1977 | Fisher | 190/43 |
| 4,091,852 | 5/1978 | Jordan et al. | 150/0.5 |
| 4,103,810 | 8/1978 | Hickey | 224/29 |
| 4,155,453 | 5/1979 | Ono | 206/522 |
| 4,215,778 | 8/1980 | Kovins | 206/314 |
| 4,262,801 | 4/1981 | Avery | 206/522 |
| 4,267,684 | 5/1981 | Ambrose | 53/472 |
| 4,294,496 | 10/1981 | Murez | 312/208 |
| 4,384,603 | 5/1983 | Tyrer et al. | 150/0.5 |
| 4,432,401 | 2/1984 | Katz | 141/4 |
| 4,468,810 | 8/1984 | Longo | 383/3 |
| 4,503,558 | 3/1985 | Lief et al. | 383/3 |
| 4,569,082 | 2/1986 | Ainsworth et al. | 383/3 |
| 4,573,202 | 2/1986 | Lee | 383/3 |
| 4,742,478 | 5/1988 | Nigro, Jr. et al. | 364/708 |
| 4,762,231 | 8/1988 | Kiselewski | 206/522 |
| 4,769,764 | 9/1988 | Levanon | 364/708 |
| 4,793,123 | 12/1988 | Pharo | 53/449 |
| 4,801,213 | 1/1989 | Frey et al. | 383/3 |
| 4,809,352 | 2/1989 | Walker | 383/3 |
| 4,826,329 | 5/1989 | Bellini | 383/3 |
| 4,837,590 | 6/1989 | Sprague | 346/145 |
| 4,872,558 | 10/1989 | Pharo | 206/522 |
| 4,874,093 | 10/1989 | Pharo | 206/522 |
| 4,877,334 | 10/1989 | Cope | 383/3 |
| 4,905,835 | 3/1990 | Pivert et al. | 206/522 |
| 5,002,184 | 3/1991 | Lloyd | 206/305 |
| 5,042,663 | 8/1991 | Heinrich | 206/522 |
| 5,135,132 | 8/1992 | Potochnik | 220/426 |
| 5,160,001 | 11/1992 | Marceau | 190/102 |
| 5,163,560 | 11/1992 | Parrish, Jr. et al. | 206/576 |
| 5,175,672 | 12/1992 | Conner et al. | 361/393 |
| 5,180,060 | 1/1993 | Forti et al. | 206/522 |
| 5,184,727 | 2/1993 | Dickie et al. | 206/522 |
| 5,190,089 | 2/1993 | Jackson | 150/165 |
| 5,214,574 | 5/1993 | Chang | 361/393 |
| 5,217,119 | 6/1993 | Hollingsworth | 206/583 |
| 5,217,131 | 6/1993 | Andrews | 220/1.5 |

(List continued on next page.)

FOREIGN PATENT DOCUMENTS

| | | | |
|---|---|---|---|
| 2063701 | 7/1971 | France . | |
| 2266474 | 10/1975 | France | 206/522 |
| 2417448 | 9/1979 | France | 206/522 |
| 2218759 | 10/1973 | Germany . | |
| 4034038 | 4/1992 | Germany . | |
| 52-34894 | 3/1977 | Japan | 206/522 |
| 6-144471 | 5/1994 | Japan . | |
| 6-156540 | 6/1994 | Japan . | |
| 9207774 | 5/1992 | WIPO . | |

Primary Examiner—Jimmy G. Foster
Attorney, Agent, or Firm—Thomas Hooker, P.C.

[57] ABSTRACT

A carrying case for a portable computer or other instrument requiring protection from injury during transport includes a body defining an interior recess, a lid for closing the recess, a bladder assembly in the recess including cushioning bladders and a cushioning and displacement bladder at the bottom of the recess and a sheath overlying the bladder. Insertion of an instrument into the recess collapses the cushioning and displacement bladder to pressurize all of the bladders in the assembly to engage and protect the computer from injury due to inertial shocks. The lid includes an insertion member which engages the computer when the lid is closed to move the computer to the final inserted position and increase the pressure in the bladder assembly.

24 Claims, 10 Drawing Sheets

U.S. PATENT DOCUMENTS

| | | | |
|---|---|---|---|
| 5,232,276 | 8/1993 | Martin | 312/208.4 |
| 5,263,587 | 11/1993 | Elkin et al. | 206/522 |
| 5,267,123 | 11/1993 | Boothroyd et al. | 361/680 |
| 5,275,290 | 1/1994 | Bierfreund | 206/522 |
| 5,285,901 | 2/1994 | Huang | 206/521 |
| 5,325,970 | 7/1994 | Dillon et al. | 206/576 |
| 5,348,157 | 9/1994 | Pozzo | 206/522 |
| 5,351,829 | 10/1994 | Batsford | 206/522 |
| 5,360,108 | 11/1994 | Alagia | 206/320 |

PORTABLE COMPUTER CARRYING CASE

FIELD OF THE INVENTION

The invention relates to carrying cases for portable computers or other instruments requiring protection against shock during transport.

DESCRIPTION OF THE PRIOR ART

Portable computers are conventionally carried in protective cases which surround the computer and afford a quantum of protection against injury to the computer during transport. Injury is liable to occur due to inertial loading of the computer when the computer is subject to rapid acceleration or deceleration, for instance, when the case holding the computer is dropped onto an immovable surface or is hit by a rapidly moving object.

Some conventional carrying cases have outer hard shells or bodies with interior padding or plastic foam such that the padding or foam is deformed and protects the computer. Other types of conventional portable computer carrying cases which afford less protection to the computer have soft fabric or leather bodies with interior padding. All of these cases are relatively heavy and add materially to the weight of a computer during transport. Most portable computers are hand carried. Cases are preferably lightweight.

Conventional portable computer carrying cases protect computers from injury due to relatively low level impacts only. There is no assurance that a conventional portable computer carrying case will protect a computer from injury due to high level impacts, for instance, when the case and computer are dropped from tabletop height or higher onto the floor.

Portable computers are lightweight, expensive and relatively delicate electronic instruments subject to injury when subjected to sudden acceleration or deceleration. The computers are designed to be portable but, because of their delicate construction, are subject to injury from shocks experienced during transport, even when hand carried. Conventional portable computer carrying cases do not protect the computers against shocks likely to be experienced during normal travel. Further, portable computer owners hand carrying portable computers tend to treat the computers like hand luggage with the resultant and increased risk of injury to the computer. Repair of a portable computer is expensive and may be time consuming.

The industry is constantly striving to decrease the weight of portable computers while increasing the performance of the computers. As a result, each new generation of computer is lighter in weight and possesses increase performance over prior computers. Present portable computer carrying cases, however, have not increased in sophistication and rely on conventional cushioning systems to protect the computer. These systems are not capable of reliably protecting modern, sophisticated and relatively delicate portable computers from injury arising from anticipated shocks encountered during normal transport.

SUMMARY OF THE INVENTION

The invention is an improved lightweight carrying case for a portable computer or a similar instrument requiring protection during transport. While the disclosure refers to a portable computer, the invention may be used to protect other types of instruments during transport.

The improved carrying case includes a base and lid defining an interior recess in the case. An inflatable bladder assembly is located within the recess and includes a number of cushioning bladders spaced around the sides of the recess and a cushioning and displacement bladder located at the bottom of the recess. The bladders are formed of a thin walled elastomer material and are interconnected by tubes.

A computer is manually inserted into the recess so that the lead end of the computer engages the cushioning and insertion bladder and collapses and folds a panel of the bladder. Air displaced from the bladder flows into the bladders surrounding the computer. Collapse of the cushioning and displacement bladder reduces the interior volume in the bladder assembly and increases the pressure of the air in the assembly so that the bladders tightly engage the sides and lead end of the computer. The computer is initially easily inserted into the recess until the displaced volume of air increases the pressure in the assembly and forces the other bladders against the sides of the computer. The force required to manually insert the computer increases with the depth of insertion.

After the computer has been manually inserted nearly to the full depth in the recess, a lid on the top of the computer is closed to move cushioning and insertion bladders mounted on the top of the lid against the exposed top of the computer and force the computer downwardly into the recess to the fully inserted position. This final downward movement of the computer further collapses the cushioning and displacement bladder to increase the pressure in the all the bladders in the assembly to tightly hold the computer in the case. In the process, the cushioning and insertion bladders on the lid are compressed against the top of the computer.

When the computer has been fully inserted and the lid is closed, the computer is supported on all sides by compressed bladders which are at essentially the same pressure so that the computer is safely cushioned within the recess in the case and is protected against injury caused by shocks.

A protective sheath extends into the recess and overlies the bladders in the assembly. The computer is inserted into the sheath. The assembly bladders sandwich the sheath against the computer.

Other objects and features of the invention will become apparent as the description proceeds, especially when taken in conjunction with the accompanying drawings illustrating the invention, of which there are ten sheets and one embodiment.

DESCRIPTION OF THE PREFERRED EMBODIMENT

Figure 1:
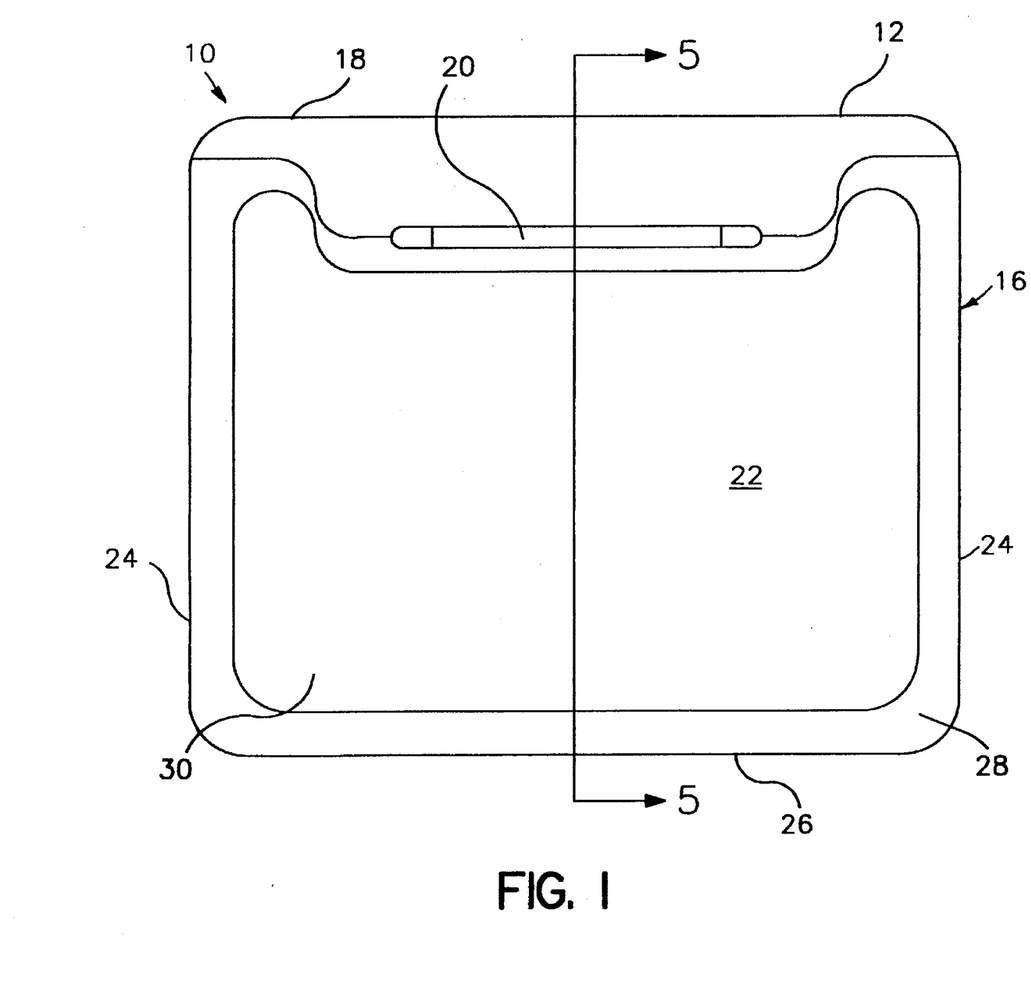
FIG. 1 is a side view of a portable computer carrying case according to the invention.
Figure 2:
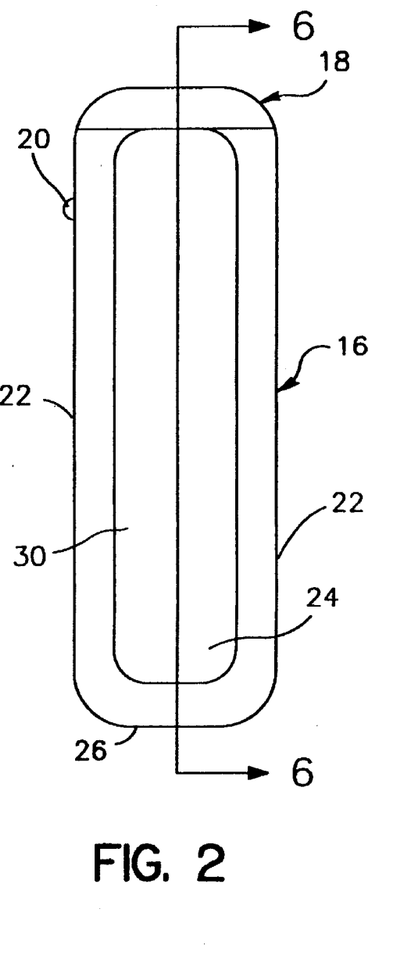
FIG. 2 is an end view of the case shown in FIG. 1.

Portable computer carrying case 10 includes a box-shaped hollow rectangular body or shell 12 defining an interior recess 14. The body includes a rigid base 16 and a rigid lid 18 mounted on the top of the base by hinge 20 so that the lid may be moved between the closed position shown in FIGS. 1 and 2 and the open position shown in FIGS. 3 and 5.

Base 16 includes opposed side walls 22, end walls 24 and a bottom wall 26. Walls 22 and 24 define an access 25 opening in the base above bottom wall 26. Hinge 20 joins the lid to the base at the top of one side wall 22. The base includes a rigid lightweight metal frame 28 formed from aluminum or magnesium and extending along the edges of the base between the walls and around the open top of the base. Lightweight panels 30 are secured to the frame in openings in the side walls, end walls and bottom wall. The panels may be formed from strong carbon fiber material. Lid 18 likewise includes a lightweight metal lid frame 32 and top panel 34. A protective sheath 36 extends into the recess 14 and is joined to the open end 38 at the top of base 16. Sheath 36 overlies the side walls 22, end walls 24 and bottom wall 26. The sheath is formed of a flexible fabric preferably woven from a high strength and low friction material, which may be ballistic nylon. The sheath may have a thickness of about 0.015 inch.

A number of inflatable bladders are secured to the interior surfaces of base 16. The bladders include a pair of like cushioning bladders 40 mounted on the interior surfaces of side walls 22, a pair of like cushioning bladders 42 mounted on the interior surfaces of end walls 24, and a cushioning and displacement bladder 44 mounted on the interior surface of bottom wall 30. The bladders have thin flexible walls about 0.011 inch thick and preferably formed from a strong plastic elastomer. The elastomer walls of each bladder define an inflatable bladder chamber. The chambers of bladders 40, 42 and 44 are connected by a plurality of tubes 46 each of which extends from the cushioning and displacement bladder 44 to an adjacent bladder 40, 42. See FIGS. 3, 5 and 6. The bladders 40, 42, and 44 and tubes 46 form a bladder assembly 48 mounted in base 16. A body of pressurized gas, preferably air, is confined in the bladder assembly.

Each side cushioning bladder 40 includes a flat large area mounting panel 50 mounted on a base side wall 22, a flat contact panel 52 overlying and spaced inwardly a distance from adjacent panel 50 and a compliant circumferential edge wall 54 extending around the circumference of the bladder and joining the two panels 50 and 52. Panels 50 and 52 are rectangular in shape. Likewise, each cushioning bladder 42 includes a mounting panel 56 mounted on an end wall 24, a contact panel 58 spaced inwardly a distance from adjacent panel 56 and a compliant circumferential edge wall 60 joining panels 56 and 58. The compliant circumferential edge walls 54 and 60 permit limited lateral shifting of the contact panels with regard to the fixed mounting panels. The upper ends of tubes 46 are joined to the lowermost portions of the circumferential walls 54 and 60. The lower ends of the tubes 46 are joined to the lower end of the cushioning and displacement bladder 44.

Figure 5:
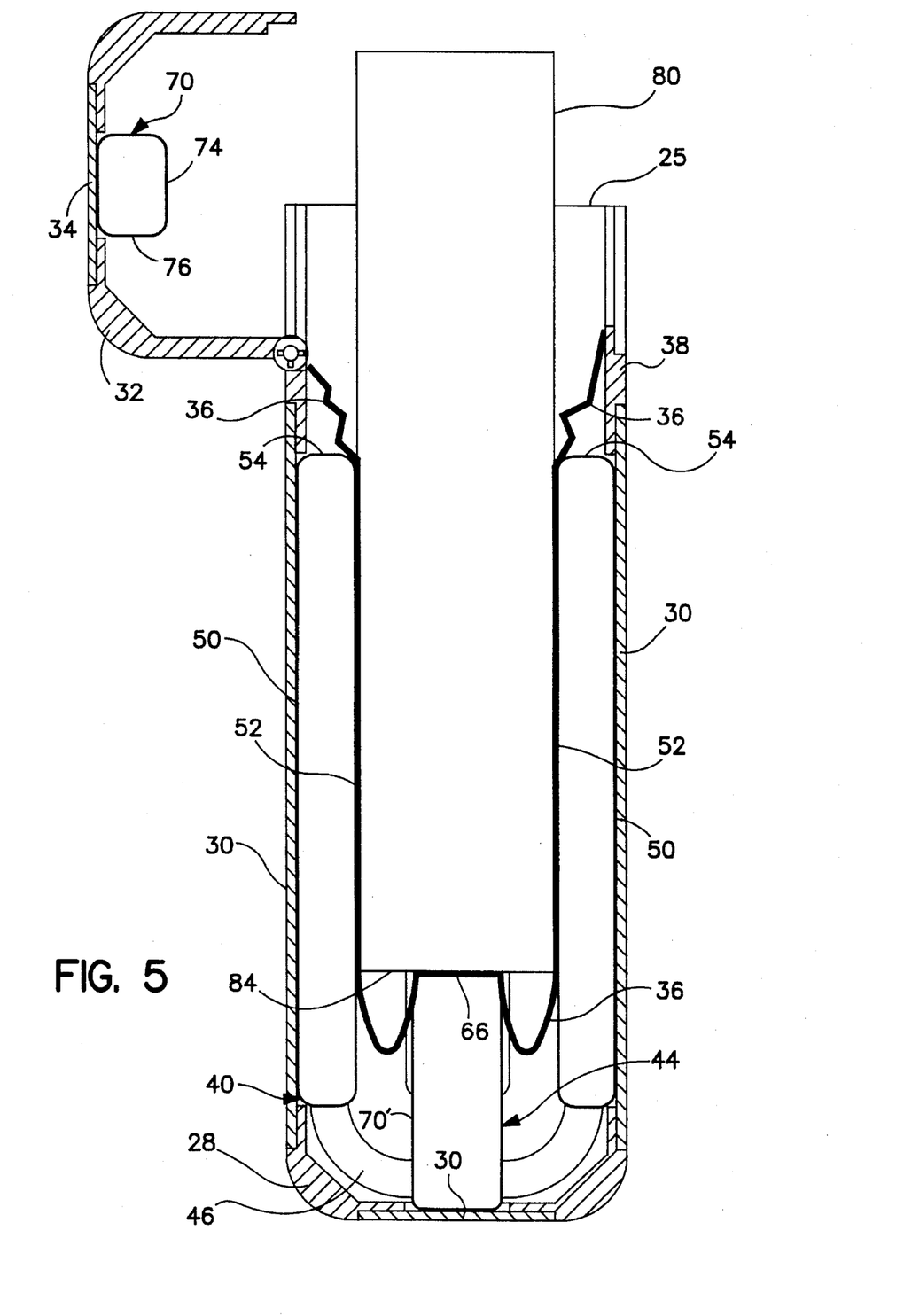
FIG. 5 is a sectional view taken along line 5—5 of FIG. 1 with the lid open and a portable computer partially inserted into the case.
Figure 6:
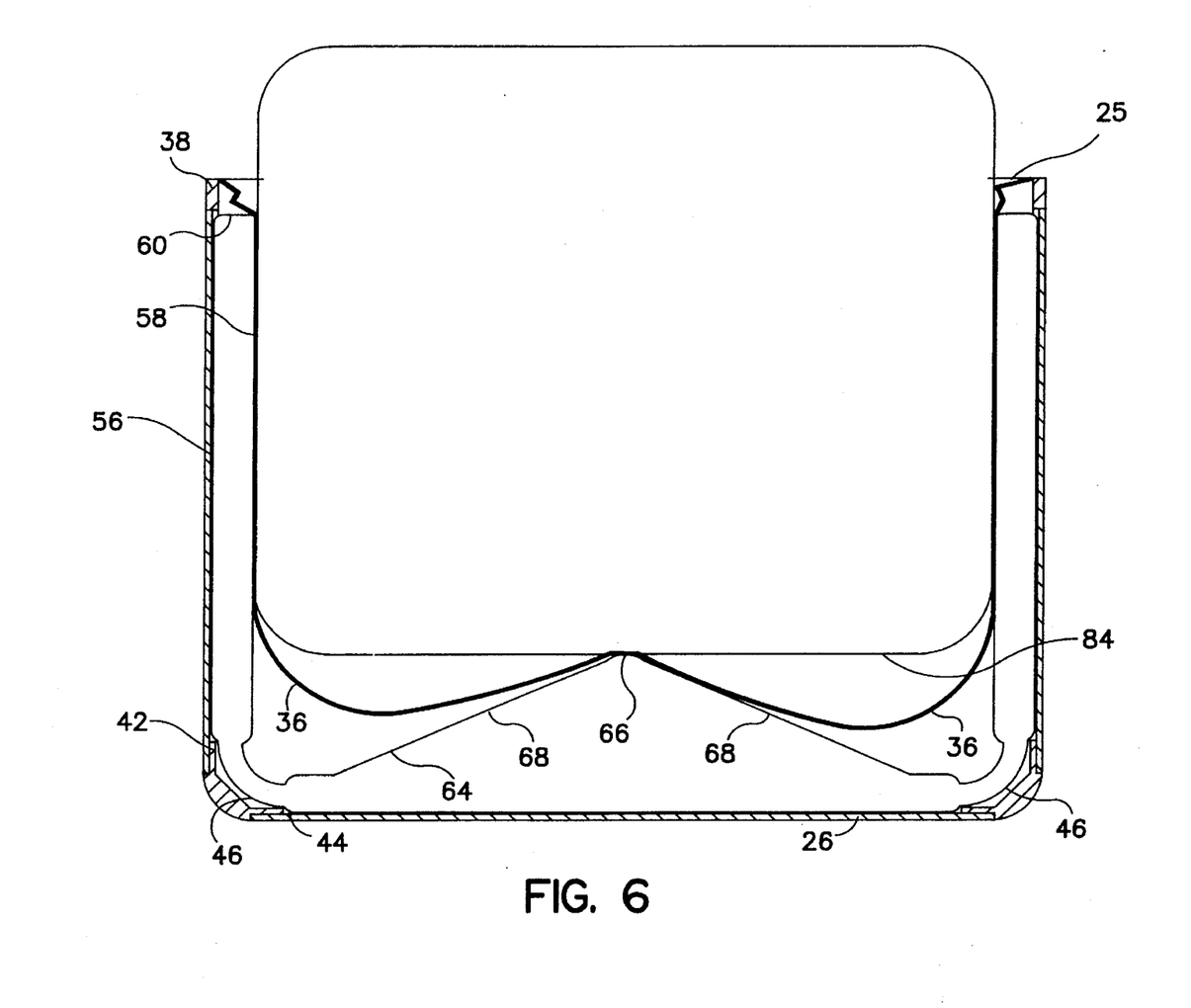
FIG. 6 is a sectional view taken along line 6—6 of FIG. 2 and with a portable computer partially inserted into the case.

Cushioning and displacement bladder 44 includes a mounting panel 62 secured to the inside of bottom wall 26 and a collapsible panel 64 joined to the circumferential edge of the mounting panel and overlying the mounting panel. When elongate bladder 44 is fully inflated as shown in FIGS. 5 and 6, panel 64 extends a distance into recess 14 above the bottom wall 26 and includes a high point or nose 66 centrally located in the recess between end walls 24 and facing the access opening 25, two downwardly sloping walls 68 extending from the high point downwardly to the ends of the bladder adjacent the ends of bottom wall 26, and a pair of vertical parallel walls 70' extending upwardly from the mounting panel 62 to the sloping walls 68 and high point 66.

A pair of spaced apart cushioning and insertion bladders 70 are mounted on the interior of lid 18. Each bladder 70 includes a mounting panel 72 secured to the inner surface of the lid, a contact panel 74 facing the interior recess 14 and a compliant circumferential edge wall 76 extending around the bladder and joining the mounting and contact panels. Thin wall bladders 70 are formed from plastic elastomer material, similar to the material forming the bladders in assembly 48.

Figure 3:
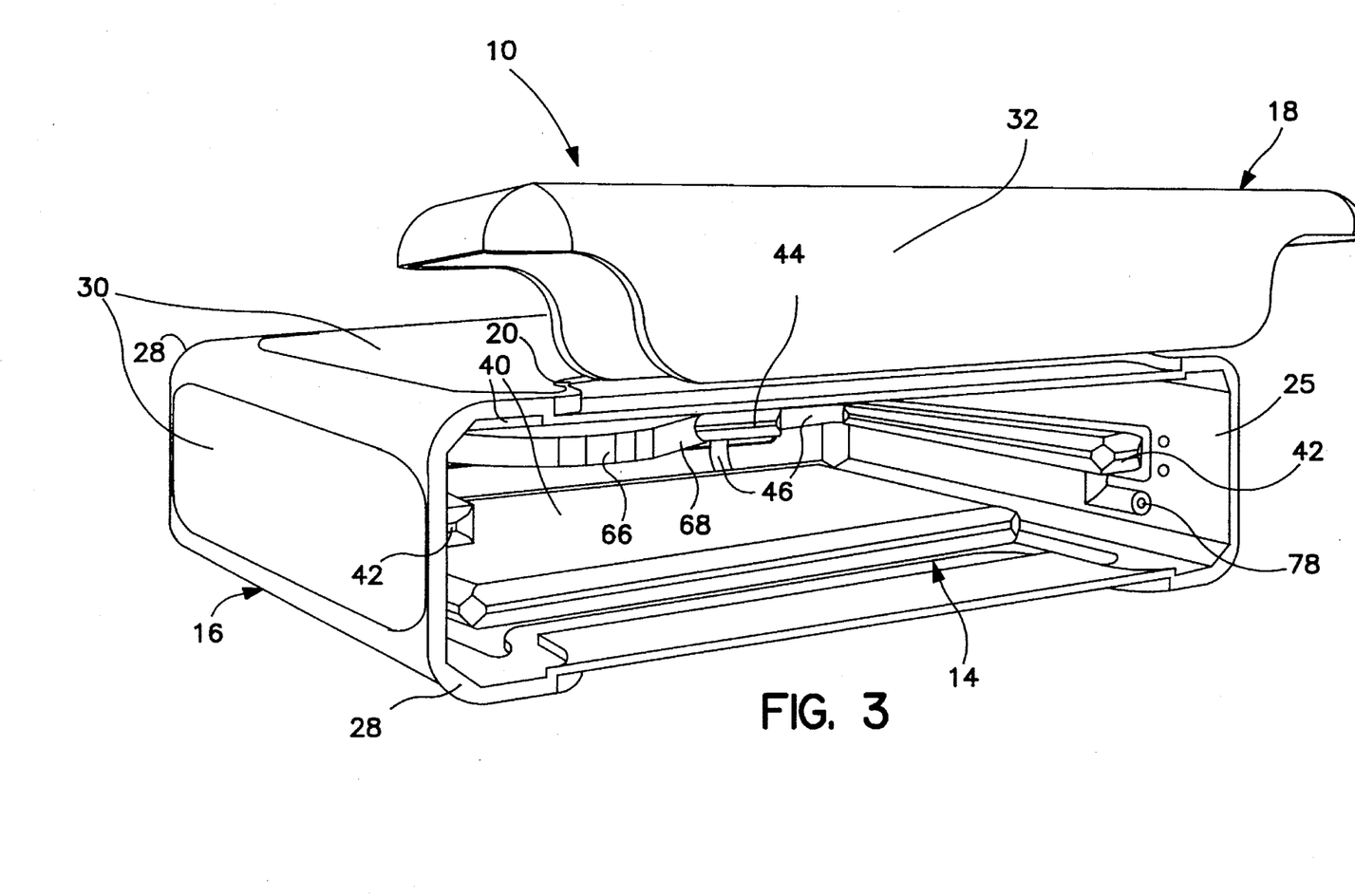
FIG. 3 is an isometric view of the case with the lid open and the sheath removed.
Figure 4:
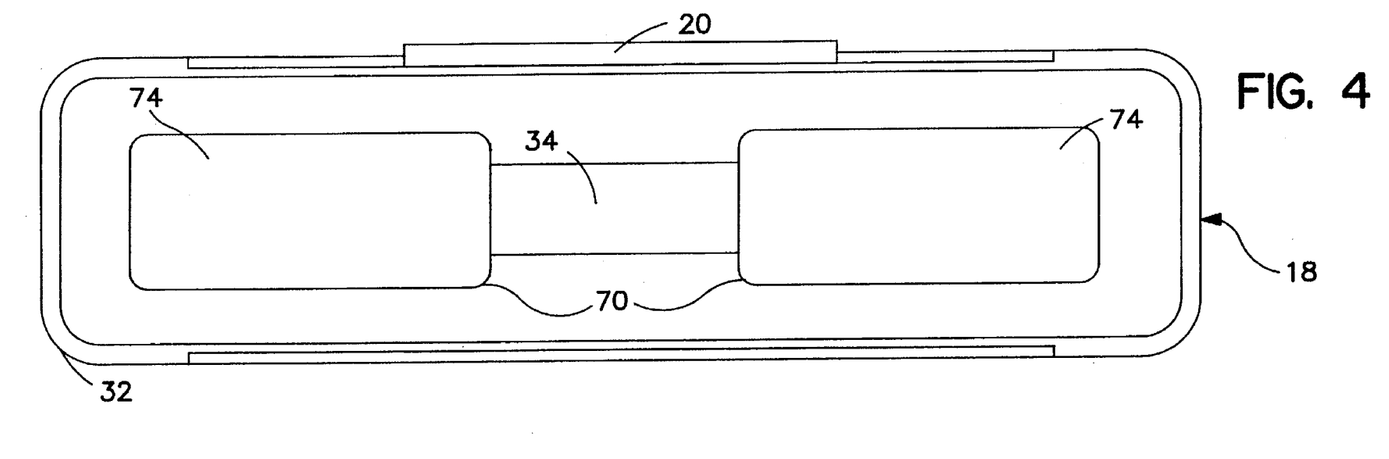
FIG. 4 is a view showing the interior of the lid.

The interiors of bladders 40, 42, and 44 in assembly 48 are interconnected through tubes 46 to permit air or a suitable gas to be flowed into the interior of the bladders through a conventional inlet port 78. As shown in FIG. 3, port 78 may communicate with the interior of one of the end cushioning bladders 42 adjacent the upper open end of base 16 and is accessible through an opening in sheath 36. Sufficient air or gas is flowed through port 78 into the bladders 40, 42, and 44 to extend the bladders to the positions illustrated in FIGS. 3, 4, and 6 with collapsible panel 64 of the cushioning and displacement bladder 44 extending upward into the interior recess 14 above bottom wall 30. The bladders in assembly 48 are initially inflated to a pressure of about 1.3 pounds per square inch. The sheath is draped over nose 66 and overlies bladders 40 and 42. The cushioning and insertion bladders 70 are permanently inflated with air or a suitable gas and normally extend a distance inwardly of lid 18 as shown in FIG. 4.

The cushioning bladders 40 are rectangular in shape and include rectangular mounting panels 50 which are spaced from rectangular contact panels 52. Panels 50 and 52 are the same size. When the bladders are in the initial inflated position, the contact panels of bladders 40 and 42 directly overlie the mounting panels and the compliant circumferential walls 54 and 60 extend inwardly from the mounting panel to the contact panel. While the drawings show the contact panels are flat, in practice these panels may bow outwardly when initially inflated.

Sheath 36 overlies the bladders 40, 42, and 44 to protect the bladders from wear when a portable computer is inserted into recess 14. Further, the sheath has a low coefficient of friction and facilitates ready insertion and removal of the computer into and from the recess 14. Sheath 36 is highly flexible and does not restrict deformation or extension of the bladders during insertion and withdrawal of the computer or during cushioning of shocks by the bladders to protect the computer from injury.

When the computer is inserted, the sheath is sandwiched between the computer and bladders 40, 42, and 44. Sheath 36 extends around the sides and bottom of computer 80. If desired, a fabric, like the fabric forming sheath 36, may be attached to the walls of lid 18 and overlie the cushioning and insertion bladders 70 to protect these bladders from wear during insertion of a computer into case 10. The sheath and fabric overlying bladders 70, if provided, form a thermal insulating layer surrounding the computer and protecting the computer from high temperatures when case 10 and inserted computer are exposed to a high temperature environment, such as the interior of an automobile left outside during a hot summer day.

Portable computer 80 has a generally rectangular body which conforms in shape to the recess in the case in the sheath 36 between the initially-inflated bladders 40, 42, and 44 to facilitate manual insertion of the computer into the open base as shown in FIGS. 5 and 6. Lid 18 is open and out of the path of insertion. The computer is freely slid into the sheath 36 until the bottom of the sheath is sandwiched between the bottom of the computer and the nose or high point 66 of bladder 44. The side and end walls of the computer slide into the sheath past the contact panels of the side and end bladders 40 and 42. The contact panels of these bladders are spaced apart distances approximately equal to the width and thickness of the computer so that the sheath is lightly sandwiched between the panels and the computer. Insertion of the computer to the position of FIGS. 5 and 6 may flatten outwardly bowed contact panels 52 of bladders 40.

Figure 7:
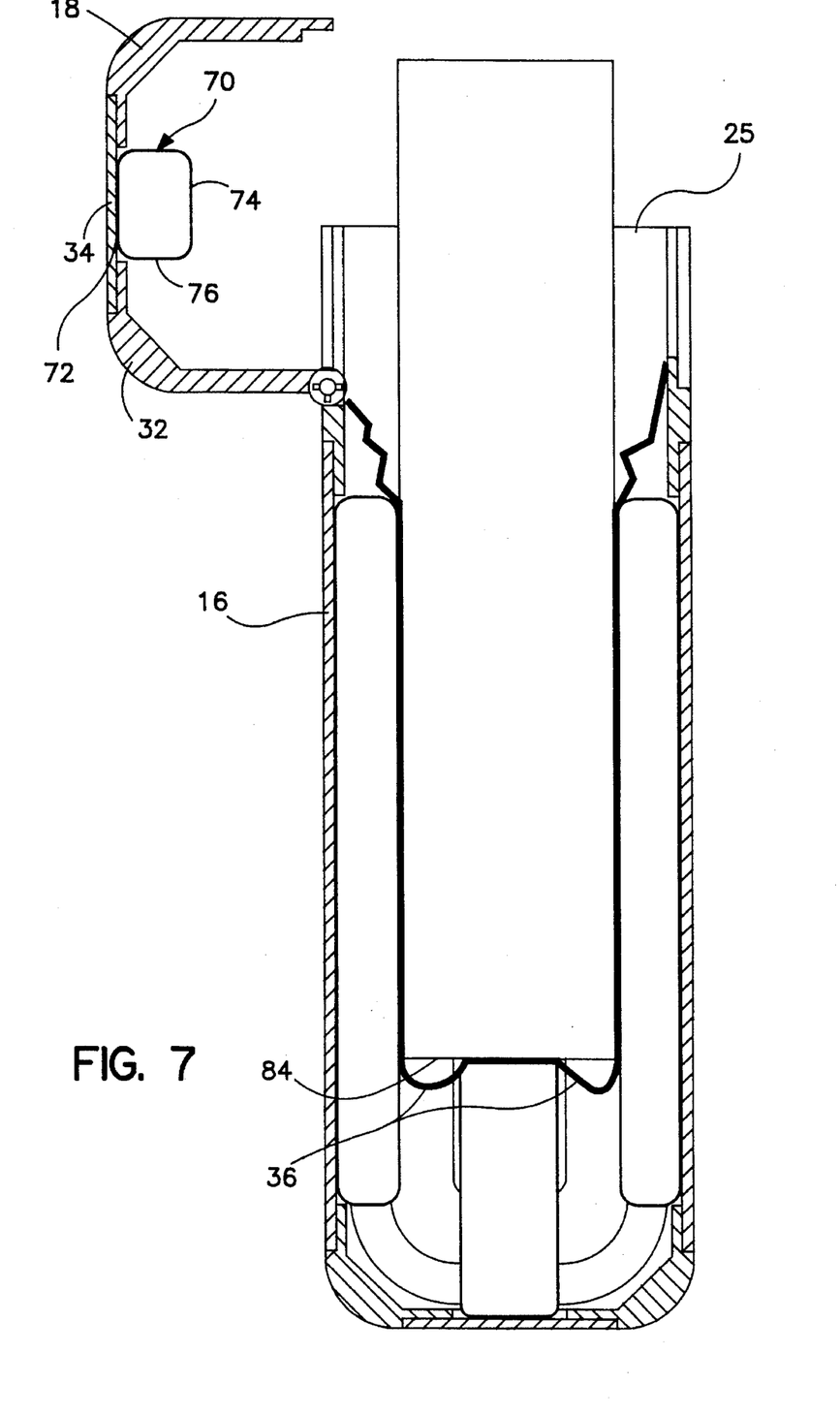
FIGS. 7 and 8 are sectional views like FIGS. 5 and 6 with the computer inserted further into the case.
Figure 8:
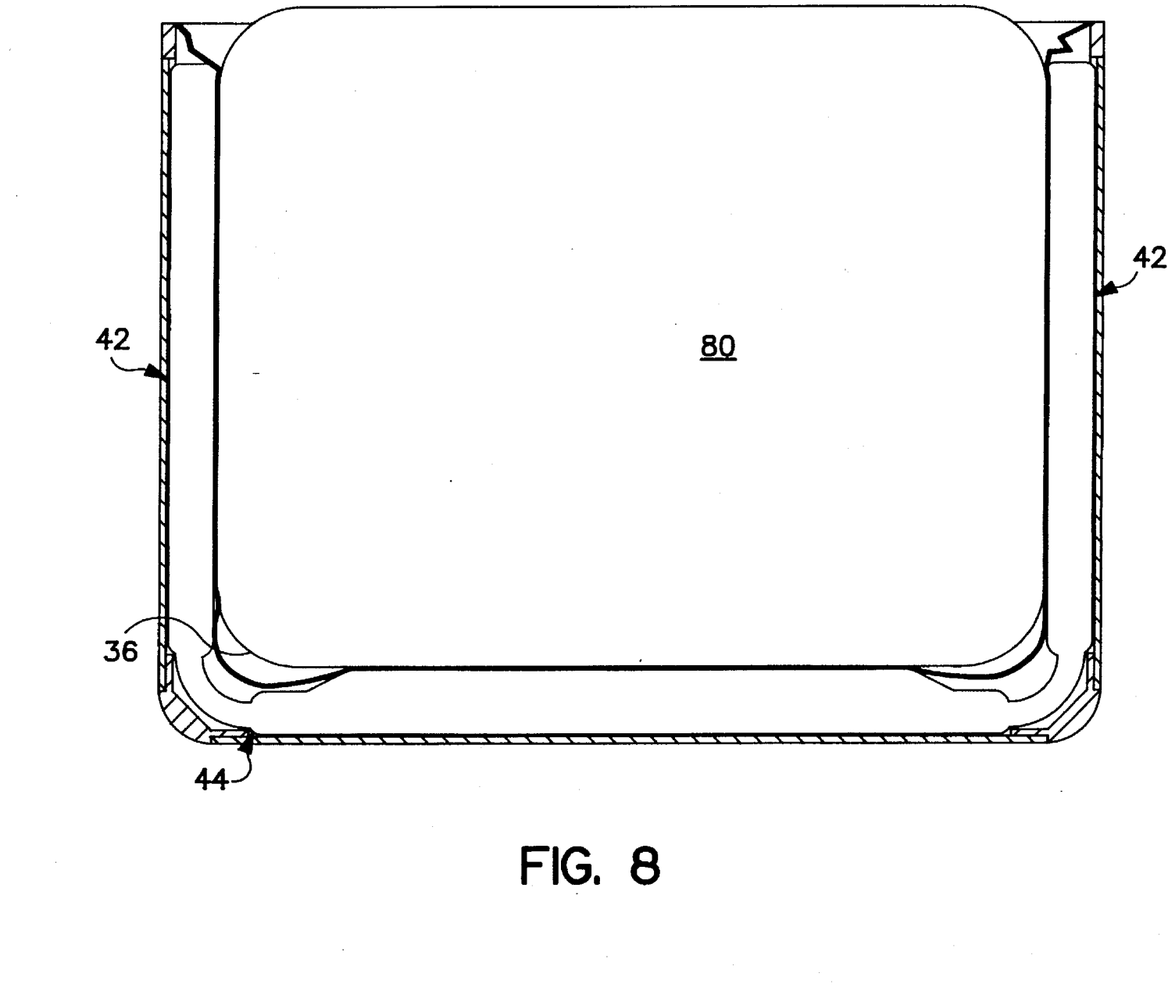

The computer is manually pushed into the base 10 from the position of FIGS. 5 and 6 to the position of FIGS. 7 and 8. During this insertion, the bottom of the computer engages and vertically collapses and folds the extended cushioning and displacement bladder 44. Gas located in the bladder 44 is displaced to increase the pressure of the gas in the bladder system 48 so that the contact surfaces of bladders 40, 42, and 44 tightly engage the adjacent walls and bottom of computer 80.

The nose is located in the center of the bladder to prevent skewing or binding of the computer during insertion. The computer is freely inserted to the position of FIGS. 5 and 6. Resistance to insertion increases as the computer is pushed down to the position of FIGS. 7 and 8. As illustrated, the computer is moved to the position of FIGS. 7 and 8 and slides along the interior walls of the sheath without downwardly shifting of the contact panels 52 and 58 of bladders 40 and 42. The gradual increase in the volume of air displaced from bladder 44 during insertion permits manual insertion to the position of FIGS. 6 and 7.

Figure 11:
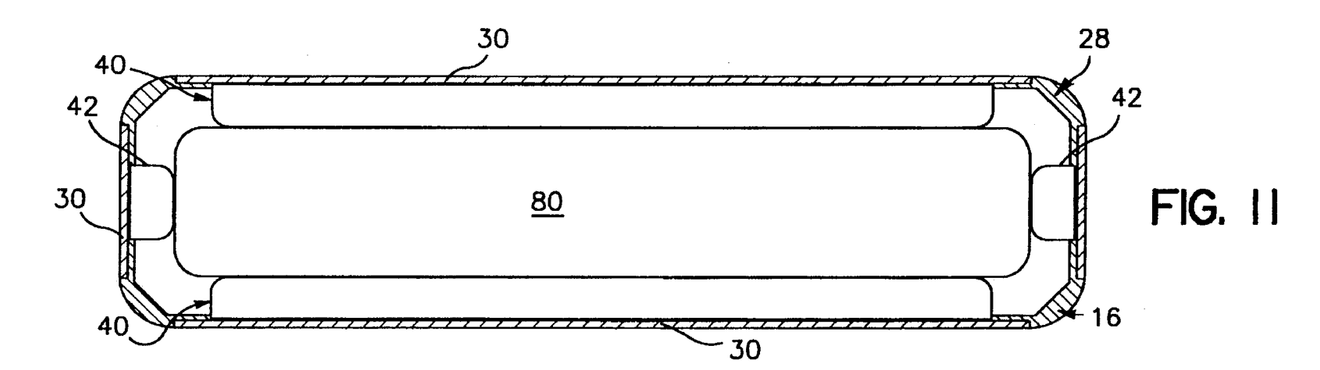
FIG. 11 is a sectional view taken along line 11—11 of FIG. 9.
Figure 12:
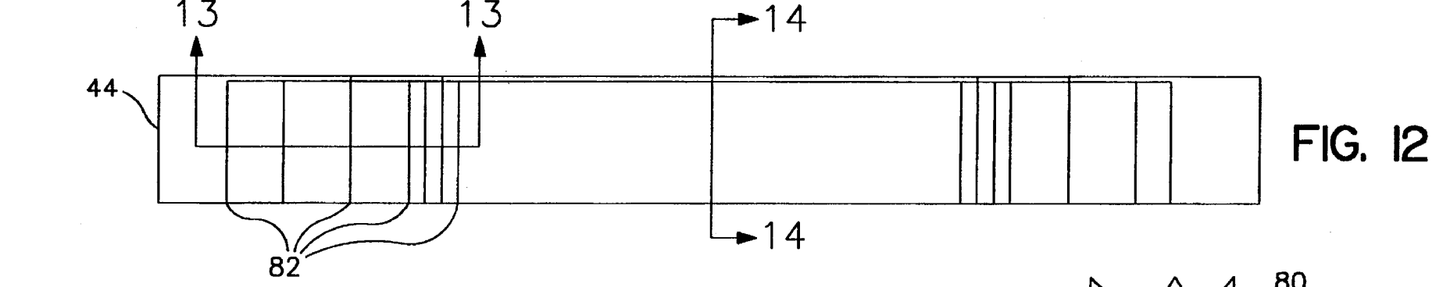
FIG. 12 is a view along line 12—12 of FIG. 10.
Figure 13:
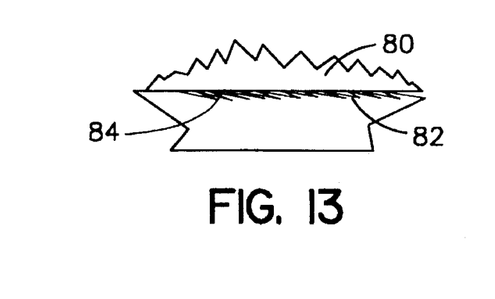
FIG. 13 is a view along line 13—13 of FIG. 12.

Insertion of the computer flattens and folds collapsible panel 64, first at nose 66 and then along the length of the panel to either side of the nose. The panel is folded into the contact area which is smaller than the area of the collapsed portion of panel 64. As illustrated, each fold 82 is formed by collapsing and bending the elastomer panel 64 back on itself in a flattened Z-shape. Each fold has three overlapping layers of panel material and is thicker than the single layer portions of the panel to either side of the folds. During flattening of panel 66, folds 82 are formed in the sloping walls 68 and vertical walls 70. The folds engage the bottom 84 of the computer. The collapsed portion of panel 64 may fold differently or at random so that the folds shown in FIGS. 11, 12 and 13 are meant to be representative only and may not accurately reflect the shape of the folded panel.

Figure 14:
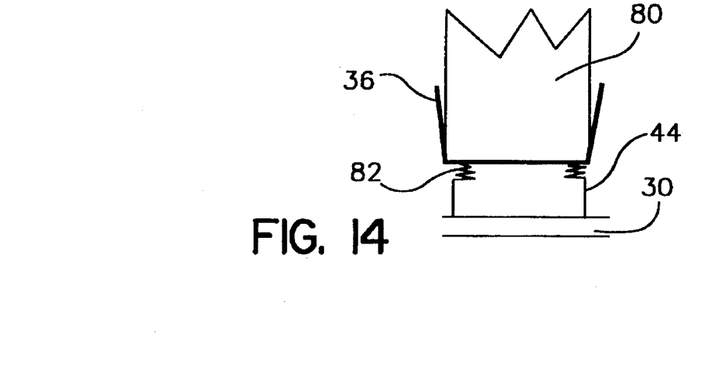
FIG. 14 is a view along line 14—14 of FIG. 12.
Figure 15:
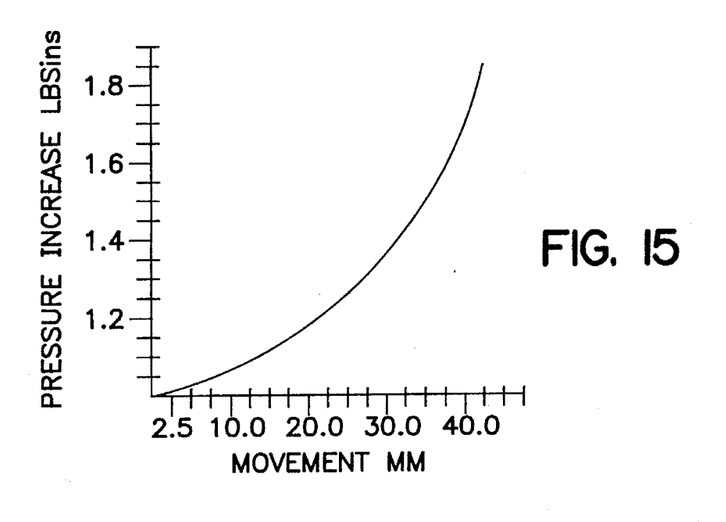
FIG. 15 is a graph illustrating the pressure in the bladder assembly during insertion of a computer into the case.

As the computer is inserted into the case, the pressure of the gas confined in the bladder assembly 48 increases as indicated in the graph of FIG. 14. The initial pressure gas in the bladder, before collapse of panel 64 may be about 1.3 psi. As indicated, initial easy manual insertion and collapse of panel 64 slowly increases the pressure in the bladder system to facilitate easy insertion. The volume of air displaced or flowed from the bladder during collapse of bladder 44 is calculated to assure that when the computer is fully inserted into the case, the bladders 40, 42, and 44 are at a high pressure of about 1.55 psi and tightly engage the bottom, sides and ends of the computer to cushion the computer against shocks.

Figure 9:
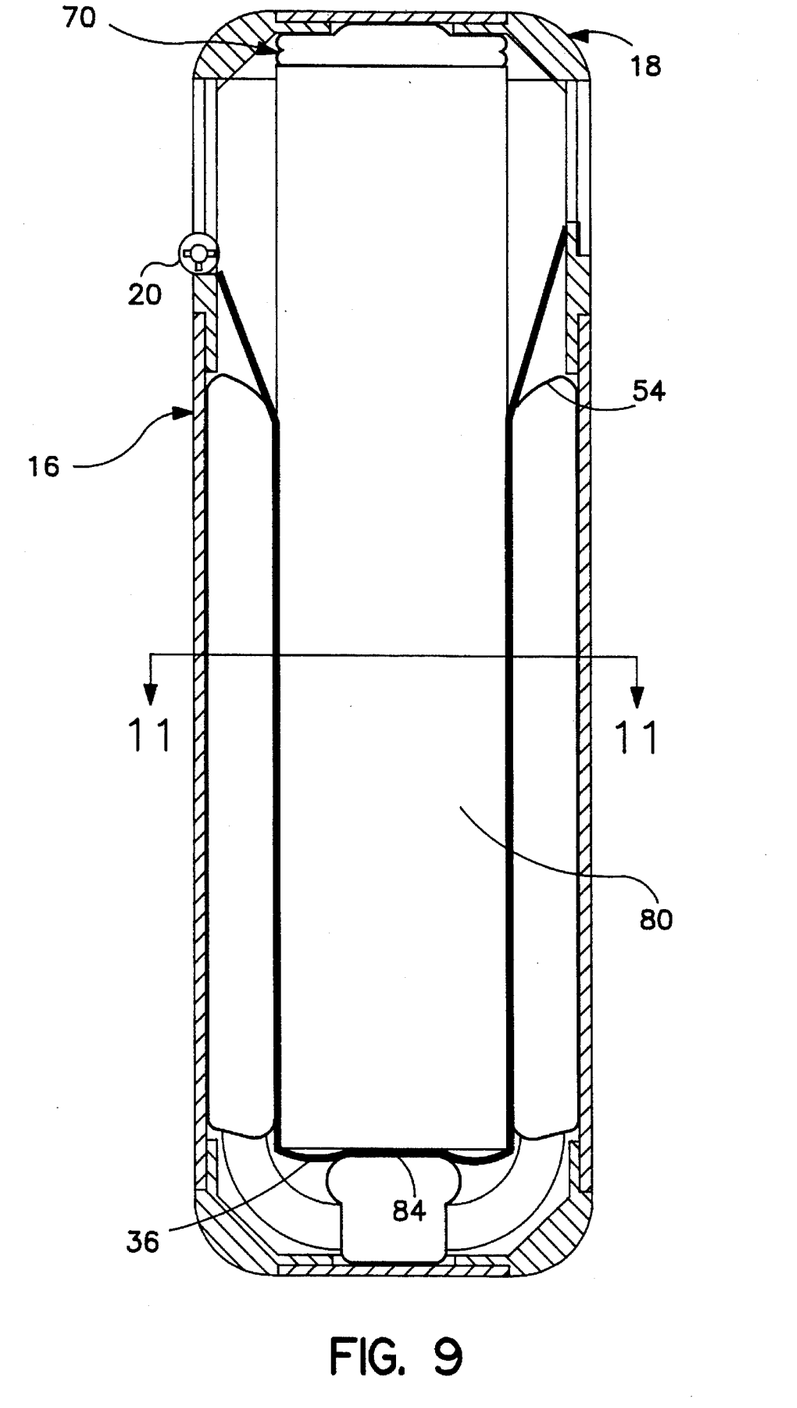
FIGS. 9 and 10 are similar sectional views with the computer fully inserted into the case.

The cushioning and displacement bladder 44 is an air pump with increasing displacement of air during collapse as the computer is moved toward the fully inserted position. When the computer first engages the bladder nose and is inserted a unit of distance, the computer engages and collapses a small contact area of the panel 64 and a small volume of air is displaced. With further insertion along a unit of distance, the computer engages and collapses a larger contact area of the panel 64 and a correspondingly greater volume of air is displaced. When the computer is moved along a unit of distance to the fully inserted position, the computer engages and collapses the full contact area of the panel 64 and a large volume of air is displaced. The contact area of the panel 64 is equal to the area of the bottom of the computer engaging the panel and corresponds to the interior cross sectional area of the inflated panel in the plane of the bottom of the computer during insertion. The contact area increases from zero at the top of the nose 66 to a maximum area when the computer is fully inserted as shown in FIG. 9. During insertion, the computer progressively collapses the panel 64 from the nose down and folds the panel at the contact area, as previously described.

The force required to move the computer to the fully inserted position increases non-linearly with the depth of insertion into the recess due to the increase of the volume of displaced air and the increase of the pressure of the air in the bladder assembly, as shown in FIG. 14.

The computer is moved manually from the position of FIG. 6 to the position of FIG. 9. Final insertion of the computer from the position of FIG. 9 to the fully inserted position of FIG. 10, with a high insertion force due to the large area final collapse of bladder 44 and large displacement of air, is achieved by manually closing the lid 18 onto the top of computer 90. Rotation of the lid about hinge 20 to the closed position moves the contact panels 74 of cushioning and insertion bladders 70 against the top of the computer, compresses the bladders 70 and forces the computer downwardly to the fully inserted position to collapse bladder 44 and increases the pressure in the bladder assembly 48 to the final insertion pressure. The final insertion position of the computer in the recess is determined by the pressure of the compressed air or gas confined within the bladders 70. This pressure is about 1.55 psi and assures the bladders in assembly 48 properly cushion the computer in the case.

Figure 10:
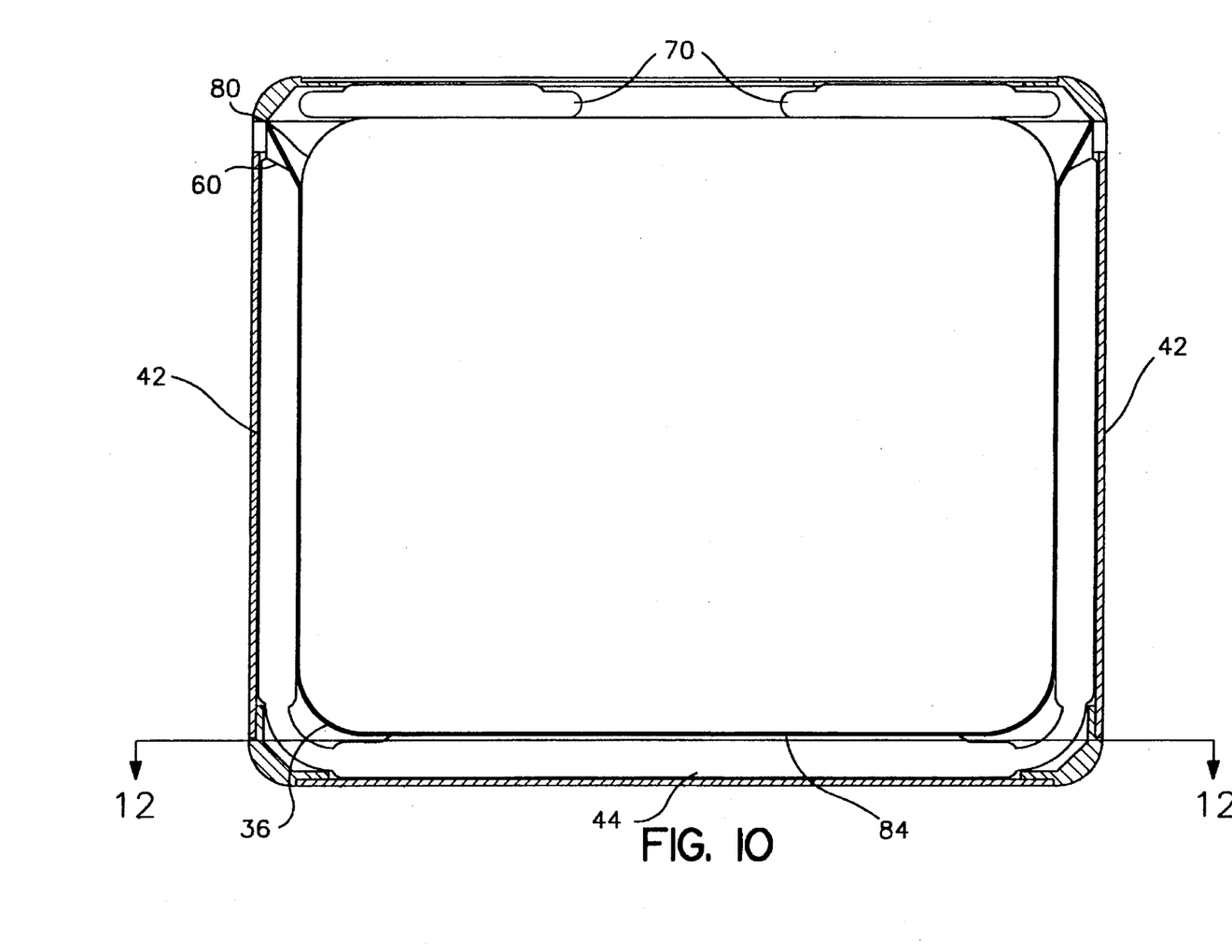

The computer is fully inserted by closing the lid without tightly engaging the bottom of sheath 36 so that a slight looseness is maintained between the bottom of the sheath and the bottom of the computer, as shown in FIGS. 9 and 10. In this way, the sheath is not taut and does not limit the pressure in the bladder assembly, as determined by the pressure of the gas in the cushioning and insertion bladders 70.

Hinge 20 may be a high friction type such that when the lid is manually closed, the hinge holds the lid in the closed position. Alternatively, the lid may be held closed by a latch or keeper.

During insertion of the computer into the base, the pressure in the side and end bladders 40 and 42 is increased and the contact panels of these bladders are forced outwardly against the sheath and adjacent walls of the computer. The frictional engagement between the contact panels, sheath, and wall of the computer during final insertion moves the panels downwardly with the computer and downwardly shifts or deforms the compliant circumferential bladder edge walls 54 and 60. In this way, the initial surface-to-surface contact between the contact panels, sheath and side and end walls of the computer is maintained by deforming the circumferential walls. Insertion forces and wear on the thin contact walls is reduced. The downward shifting of contact panels relative to the mounting panels with compliant shifting of the circumferential edge walls is illustrated in FIG. 9.

Case 10 effectively protects computer 90 from injury due to inertial loading. The computer is surrounded on all sides by inflated and compressible bladders which firmly hold the computer in place in the recess. When the case is subjected to a rapid acceleration or deceleration, the confined computer will tend to remain in place or continue prior movement due to inertia and, as a result, will be moved against one of the bladders thereby rapidly increasing the pressure in the bladder. This increase in pressure resists movement of the computer and effectively cushions or slows the movement of the computer without injuring the computer. Case 10 is normally carried in an upright position with lid 18 at the top of the computer. The bladders in assembly 48 preferably provide for a collapse distance of about ½ inch which is sufficient to effectively cushion the computer against injury when the case is dropped from tabletop level.

During cushioning of a shock, the air within the cushioning bladder or bladders is very rapidly compressed by the sharpness of the shock. There is insufficient time to flow air out from the bladder through the relatively small diameter tubes 46. The bladders are soft supportive independent gas springs. Movement of the computer toward a bladder increases the pressure of the air in the bladder to cushion the computer effectively. Additionally, the elastomeric circumferential walls of the bladders are outwardly bowed, stressed and absorb energy to aid cushioning.

After the shock has been cushioned, the bladders return to the normal position as illustrated in FIG. 10 with the computer centrally located in the case.

Base 16 and lid 18 are very light and very strong. The case withstands high shocks without injury to the metal frames or panels mounted in the frames. In the event the case is subjected to a severe high shock, the base and lid may be damaged by impact and absorb energy while the bladders protect the computer in the case.

Case 10 is particularly useful in protecting relatively delicate portable computers against shocks during transport. However, it is intended that the invention not be limited to cases for portable computers but include cases used for protecting computers and other types of delicate instruments against shock during transport.

Carrying case 10 includes a rigid base and lid and interior bladder system. The disclosed bladder system may be used to cushion a portable computer or other instrument without the necessity of a rigid base and lid as disclosed. For instance, it is contemplated that the bladder assembly 48 may be mounted in a non-rigid body such as the shell of a conventional soft portable computer carrying case now commercially available.

Further, case 10 has been described with cushioning and insertion air bladders 70 mounted on the interior of the lid for moving the computer through the final length of the insertion stroke, from the position of FIG. 9 to the position of FIG. 10 and cushioning the top of the computer. It is contemplated that other types of insertion members than bladders 70 may be mounted on the interior of lid 18 for final insertion of the computer. For instance, an insertion member or members may be made of a deformable styrofoam block preferably covered with a suitable protective material, such as the ballistic nylon fabric used for sheath 88.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. An instrument carrying case comprising a body defining a hollow instrument-receiving recess with an access opening at one side of the recess, the body including a first side wall adjacent to the access opening and a bottom wall facing the access opening; and a bladder assembly in the body recess, the assembly including a first bladder on the first side wall having a first compliant contact panel facing the recess, a second bladder on the bottom wall having a mounting panel and a second compliant contact panel facing the access opening; a gas passage joining the bladders; and a gas confined in the interior chambers of the bladders; said second contact panel including a collapsed portion including a flattened Z-shaped fold with three overlapping panel layers spaced outwardly from the mounting panel.

2. An instrument carrying case as in claim 1 wherein said high portion is centrally located in the recess.

3. An instrument carrying case as in claim 2 wherein the second bladder is elongate, said high portion is located centrally along the length of the second bladder and such bladder includes a pair of sloping wall portions each extending from one side of the high portion toward an end of the bladder.

4. An instrument carrying case as in claim 1 wherein the body includes a second sidewall located across the recess from the first sidewall, and a third bladder on the second sidewall, the third bladder having a third compliant contact panel facing the recess, and wherein said gas passage joins the third bladder to the other bladders.

5. An instrument carrying case as in claim 4 wherein the first and third bladders each include a mounting panel and a compliant edge wall extending around the circumference of the bladder between the mounting panel and the contact panel, such bladders having insertion positions with the edge walls and contact panels laterally shifted away from the access opening relative to the mounting panels.

6. An instrument carrying case as in claim 4 including a flexible sheath joined to the body adjacent the access opening and extending into the recess and overlying said bladders.

7. An instrument carrying case as in claim 6 wherein said sheath is slack when an instrument is fully inserted into the recess.

8. An instrument carrying case as in claim 4 wherein said bladders are formed from thin walled elastomeric material.

9. An instrument carrying case as in claim 4 including a lid, a connection joining the lid to the body adjacent the access opening to permit movement of the lid between open and closed positions, and an instrument insertion member on the interior of the lid and overlying the recess when the lid is closed whereby closing of the lid moves the instrument insertion member into engagement with an instrument partially-inserted into the recess and moves the instrument to the fully inserted position.

10. An instrument carrying case as in claim 9 wherein said instrument insertion member comprises a bladder.

11. An instrument carrying case as in claim 10 wherein said connection comprises a hinge.

12. An instrument carrying case as in claim 4 wherein said body is rigid.

13. An instrument carrying case as in claim 4 wherein said body is non-rigid.

14. An instrument carrying case as in claim 4 wherein said bottom wall and second bladder are elongate and narrow, said fold is located approximately midway along the length of the second bladder and extends substantially across the width of such bladder and the compliant panel includes substantially parallel side walls adjacent said body side walls.

15. An instrument carrying case as in claim 14 wherein the second compliant panel includes unfolded single thickness portions located to either side of the fold.

16. An instrument carrying case as in claim 15 wherein the body is rigid and includes opposed end walls; and including fourth and fifth bladders on the ends walls, such bladders each including a compliant contact panel facing the recess, said passage joining the fourth and fifth bladders to the other bladders.

17. An instrument carrying case comprising a body having two opposing side walls, two opposed end walls and a bottom wall defining an instrument-receiving recess with an access opening away from the bottom wall; a bladder assembly in the recess including a bladder on each wall; a body of gas confined in the bladders and a gas passage communicating the interiors of the bladders; each bladder having a mounting panel on a wall and a compliant contact panel facing the recess; the contact panel of the bladder on the bottom wall having a high portion located above the bottom wall approximately midway between said end walls and located centrally between the side walls, and generally straight, downward sloping portions located to either side of the high portion and extending toward the end walls.

18. An instrument carrying case as in claim 17 wherein the contact panel of the bladder on the bottom wall includes a flattened Z-shaped fold having three panel layers in the high portion and a pair of unfolded single layer walls located on opposite sides of the high portion and sloping from the high portion toward the bottom wall.

19. An instrument carrying case as in claim 18 wherein said body is rigid and includes a lid, a connection joining the lid to one of said side walls and an instrument insertion member on the interior of the lid.

20. An instrument carrying case as in claim 19 wherein said instrument insertion member comprises a lid bladder having a mounting panel on the lid and a lid compliant contact panel facing the recess, and a gas passage connecting such bladder to the other bladders.

21. An instrument carrying case as in claim 17 wherein the bladders on the sidewalls each include a laterally shiftable circumferential edge wall.

22. An instrument carrying case comprising a body having opposed side walls and a bottom wall, said walls defining an interior instrument-recess with an access opening facing away from the bottom wall; a bladder assembly in the recess including a bladder on each wall and a passage connecting the interiors of the bladders; and a body of gas confined in the bladders, each bladder having a mounting panel on a wall and a compliant panel overlying the mounting panel and facing the recess, each bladder on a side wall including a laterally shiftable wall extending circumferencially around the bladder, said shiftable wall joining the mounting and compliant panels, and extending generally perpendicularly outwardly from an adjacent one of said side walls.

23. An instrument carrying case as in claim 22 wherein said body is rigid and includes opposed narrow end walls so that the recess is elongate, and the bladder assembly includes a bladder on each end wall, such bladders each including a mounting panel on an end wall and, a compliant panel overlying the mounting panel and facing the recess and a laterally shiftable wall extending circumferencially around to the bladder.

24. An instrument carrying case comprising a body defining a hollow instrument-receiving recess with an access opening at one side of the recess, the body including a first side wall adjacent to the access opening and a bottom wall facing the access opening; and a bladder assembly in the body recess, the assembly including a first bladder on the first side wall having a first complaint contact panel facing the recess, a second bladder on the bottom wall having a second complaint contact panel facing the access opening; a gas passage joining the bladders; and a gas confined in the interior chambers of the bladders; said second contact panel including a collapsed portion including a flattened Z-shaped fold with three overlapping panel layers in which adjacent panel layers are in contacting relationship.

* * * * *